3,381,038
COPOLYMERIC ETHER GLYCOL
Gerald R. Lappin, Kingsport, Tenn., assignor to Eastman Kodak Company, Rochester, N.Y., a corporation of New York
No Drawing. Continuation-in-part of application Ser. No. 231,588, Oct. 18, 1962. This application Nov. 14, 1966, Ser. No. 593,732
3 Claims. (Cl. 260—611)

This application is a continuation-in-part of copending United States application Ser. No. 231,588, filed Oct. 18, 1962, and now abandoned.

This invention relates to intermediates useful for the preparation of fibers, films, and other shaped objects having elastomeric properties and more particularly to copolymeric ether glycols prepared by the copolymerization of tetrahydrofuran with trans - 8 - oxabicyclo[4:3:0]nonane or 3 - methyl - 8 - oxabicyclo[4:3:0] - nonane.

It is known from the work reported by Wittbecker, et al., J. Am. Chem. Soc. 82, 1218 (1960), that 8 - oxabicyclo[4:3:0]nonane can be polymerized to form a homopolymer, although the material the production of which is reported in this article was not indicated as having any usefulness in the production of fibers or related products having elastomeric properties. Further work has indicated that such homopolymers can not be employed for the manufacture of such products. In the referenced article the same authors describe the copolymerization of tetrahydrofuran with 7 - oxabicyclo[2:2:1]heptane employing ferric chloride and thionyl chloride as the catalyst system. The resulting product is a polymeric etheralkylenedihalide rather than a poly(ether glycol) and cannot be used for the preparation of elastomeric polyester compositions of the fiber and film forming types because the product contains chlorine as terminating groups and does not provide the OH groups necessary for the production of polyesters. Furthermore, the polymeric etheralkylenedihalides prepared were too high melting to yield elastomeric polyesters even if hydroxyl termination were present, the melting points of the copolymers described being of the order of 149–170° C. and higher, melting points which would preclude the use of such material for the production of any type of useful elastomeric textile fiber or film.

It is well known in the art that for a polymer to have elastic properties it must consist of alternate so-called "hard" and "soft" segments. The hard segment has a rigid structure and serves as an anchor point to prevent the polymer molecules from slipping over one another. This segment may be an actual chemical link between adjacent polymer chains or it may be a rigid high melting crystalline unit such as a short block of a high melting polyester, polyamide, polyurea or the like. The soft segment must be a long flexible molecule capable of assuming a compact, coiled configuration when not under stress. Under stress it must extend freely to a relatively linear configuration but return to the coiled structure when the stress is removed. Thus it must be free of any intermolecular forces which would tend to hold it in the extended position and in particular it must not crystallize in the extended configuration. To do so would prevent a return of the polymer molecule to its unextended state and thus the substance would not have elastic properties but would have a high degree of set. The commonly used soft segments are low melting polyesters or polyethers derived from polyether glycols. Of this latter class the most useful is poly(tetramethylene glycol) (I):

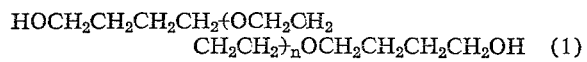
(1)

Useful elastomeric polyesters and polyurethanes have been prepared employing this polyether glycol as the source of the soft segments. However, the melting point of poly(tetramethylene glycol) is approximately 35–40° C. In polyesters and the like prepared from this compound the soft segment will, therefore, tend to crystallize at some temperature near the melting point of the polyether glycol. In practice, it has been found that this soft segment does partially crystallize at 20–25° C. particularly when a fiber, film or other object made from such a polymer is held in a stretched condition below this critical temperature. This partial crystallization prevents the complete return of the stretched object to its original dimensions and thus impairs its usefulness. The temperature at which this loss of elastic properties occurs is in the range of the temperatures at which fibers and films are usually used, i.e., from near normal room temperature to about 0° C. For this reason, a lower-melting polyether glycol which retained the desirable qualities of poly(tetramethylene glycol) would be of considerable utility for the preparation of elastomeric polyesters, polyurethanes and the like. That the soft segment remains liquid at relatively low temperatures is a necessary but not sufficient requirement for the production of a good elastomer therefrom. For example, polypropylene glycol has a satisfactorily low melting point but, because of other defects, does not give good elastomeric polyesters. Also, the homopolymer of 8 - oxabicyclo[4:3:0]nonane above mentioned, while a liquid even at 0°, gives polyesters which have little or no elasticity. Thus, it cannot be known without experiment whether a particular non-crystallizing liquid polyether glycol will be useful for preparing elastomeric polyesters and the like. In fact, of a large number of such liquid polyether glycols that have been tested only those of the instant invention have proven completely satisfactory for the preparation of useful polyester elastomers.

This invention has as its principal object the provision of intermediates useful for the preparation of fibers, films, and other shaped objects haing elastomeric properties.

Another object is to provide an intermediate which can be successfully employed in the production of elastomeric polyester fibers in which the so called soft segments thereof will have a reduced tendency to crystallize and thus give rise to set in the fiber or other material upon being subjected to sustained stretching or extension.

A further object is to provide an intermediate for the production of elastomeric polyester fibers which will have generally improved properties in conjunction with the above mentioned reduction in the tendency to experience set upon stretching.

Other objects will appear hereinafter.

These objects are accomplished by the following invention which is based upon the discovery that certain copoly(ether glycols) resulting from the copolymerization of tetrahydrofuran with certain cyclic ethers, namely, trans-8-oxabicyclo[4:3:0]nonane and trans-3-methyl-8-oxabicyclo[4:3:0]nonane, over a wide range of ratios of the cyclic ethers can, by appropriate reaction with the other necessary ingredients for the production of polyesters, give rise to segmented elastomeric polyester compositions containing "soft segments" which have a definitely reduced tendency to crystallize when the elastomer of which they form a part are stretched at temperatures in the range of 15–30° C. The uniqueness of the invention is futher demonstrated by the discovery that, of the cyclic ethers known to the inventor as being capable of homopolymerization, only the above two cyclic ethers will copolymerize with tetrahydrofuran to give the intermediate copoly(ether glycols) useful in the preparation of fibers, films, and other shaped objects having elastomeric properties with improved low temperature characteristics. Even more surprising is the discovery that even for these two cyclic ethers only one of the two geometric isomers in which each exists gives useful results. These novel copolyetherglycols may be represented by the structural formula:

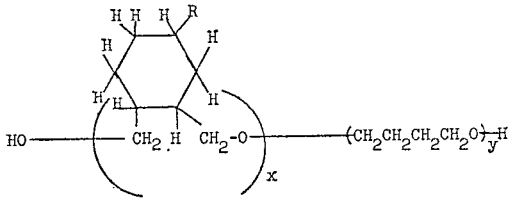

wherein R is a substituent selected from the group consisting of hydrogen or methyl, $x$ and $y$ are integers greater than zero and selected from the group defined by the equations $x<y$ and $x+y=14$ to 70 and wherein the two repeat units are distributed in a random manner in the copolymer molecule.

As will be more specifically set forth in the examples that follow, the copolymerization reaction to produce the intermediates of the invention may be carried out in accordance with well known polymerization techniques. The preferred catalyst for the polymerization is fluosulfonic acid. By varying the ratio of catalyst to cyclic ether the molecular weight of the resultant copoly(ether glycol) can be varied from about 1,000 to more than 10,000. It has been found that copolymers containing as little as 5 mole percent of the trans 8-oxabicyclo[4:3:0]nonane to as much as 95 mole percent of this ether may readily be prepared in this manner. The resulting copolymers range from viscous liquids to soft waxes at room temperature. Such copoly(ether glycols) can be considered to be modified poly(tetramethylene glycol) (I) in which part of the repeating tetramethyleneoxy groups are replaced by 1,2-cyclohexanedimethyleneoxy Groups II or by 4-methyl-1,2-cyclohexanedimethyleneoxy Groups III

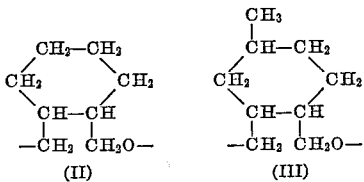

The use of poly(tetramethylene glycol) as a soft segment in elastomeric polyesters, polyurethanes and the like is well known. The use of my new copoly(ether glycol) in place of poly(tetramethylene glycol) gives elastomers of improved low temperature properties. For this purpose the copolyether glycol may contain from about 5 to about 50 mole percent of trans 8-oxabicyclo[4:3:0]nonane or 3-methyl-8-oxabicyclo[4:3:0]nonane, the preferred range being from about 7 to about 15 mole percent. The number average molecular weight may be from about 2,000 to about 6,000.

In the following examples and description, I have set forth several of the preferred embodiments of my invention, but they are included merely for purposes of illustration and not as a limitation thereof.

EXAMPLE 1

A mixture of 274 g. (3.8 moles, 95 mole percent) of dry tetrahydrofuran and 24 g. (0.2 mole, 5 mole percent) of trans 8-oxabicyclo[4:3:0]nonane was stirred and chilled to $-10°$ C. To this was added rapidly 9.0 ml. of fluosulfonic acid. The mixture was then rapidly warmed to 40° and held at 35–40° C. for 2 hours. At this time 250 ml. of hot water was added and steam was passed into the mixture for 3 hours. The resulting polymer layer was washed with three portions of boiling water. To it were then added 250 ml. of toluene and a slurry of 35 g. of calcium hydroxide in 100 ml. of water. This mixture was stirred for 1 hour and then filtered. The aqueous layer was separated and the toluene solution was dried by azeotropic distillation. After again filtering the toluene solution the solvent was stripped under vacuum to give 172 g. of product. This copoly (ether glycol) was a soft wax at 25° and melted at about 30° and had a number average molecular weight of 4,380 as determined by boiling point elevation in toluene.

EXAMPLE 2

The polymerization was carried out as in Example 1 except that 245 g. (3.4 moles, 85 mole percent) of tetrahydrofuran, 75 g. (0.6 mole, 15 mole percent) of trans 8-oxabicyclo[4:3:0]nonane and 14.5 ml of fluosulfonic acid were used. After isolation of the polymer as in Example 1, there was obtained 158 g. of viscous liquid having a number average molecular weight of 1,707.

EXAMPLE 3

A polymerization was carried out as in Example 1 except that 216 g. (3.0 moles, 75 mole percent) of tetrahydrofuran, 126 g. (1.0 mole, 25 mole percent) of trans 8-oxabicyclo[4:3:0]-nonane and 12 ml. of fluosulfonic acid were used. There was obtained, after isolation as in Example 1, 190 g. of viscous liquid having a number average molecular weight of 2,350.

EXAMPLE 4

A polymerization was carried out as in Example 1 except that 144 g. (2.0 moles, 50 mole percent) of tetrahydrofuran, 252 g. (2.0 moles, 50 mole percent) of trans 8-oxabicyclo[4:3:0]-nonane and 12 ml. of fluosulfonic acid were used. The polymer obtained after isolation as in Example 1 weighed 182 g. It was a viscous liquid having a number average molecular weight of 2,730.

EXAMPLE 5

The polymerization was carried out as in Example 1 except that 90 g. (1.35 moles, 90 mole percent) of tetrahydrofuran, 21 g. (0.15 mole, 10 mole percent) of 3-methyl-8-oxabicyclo[4:3:0]-nonane and 3.8 ml. of fluosulfonic acid were used. After isolation as in Example 1, there was obtained 58 g. of polymer which was a viscous liquid of molecular weight 3,970. Analysis by NMR showed that this polymer contained about 12 percent of ether residues derived from 3-methyl-8-oxabicyclo[4:3:0]nonane.

As indicated above it has been found that improved elastomeric polyester products such as fibers, filaments, yarns, films and other shaped objects may be produced by employing as the source of the so-called soft segments in such polymeric material the copolymeric ether glycols of the instant invention. The production of such improved elastomeric products is the invention of Alan Bell, Charles J. Kibler and James G. Smith and is described and claimed in their U.S. Patent 3,243,413, issued Mar. 23, 1963. The two examples given below illustrate the use of the new compositions of the instant invention as applied to the manufacture of such improved elastomeric polyester products.

EXAMPLE 6

A 250 ml. flask equipped with stirrer, nitrogen inlet and distillation head was charged with 8.56 g. (0.0308 mole) of dibutyl terephthalate, 7.5 g. (0.0520 mole) of trans-1,4-cyclohexanedimethanol, 33.0 g. (.01 mole) of a polyether of number average molecular weight 3,300 prepared from a mixture of 85 mole percent tetrahydrofuran and 15 mole percent trans 8-oxabicyclo[4:3:0] nonane, 12 g. of Aroclor 5442, 0.4 g. of dilauryl thiodipropionate and 0.6 ml. of a 21 percent solution of Mg[HTi(OC$_4$H$_9$)6]$_2$ in n-butanol.

The mixture was stirred and heated under nitrogen to a temperature of 200° C. During the first, or alcoholysis stage of the reaction, butanol is evolved and collected. After sixty minutes, the reaction temperature was increased over a forty minute period to 280° C. A vacuum was then rapidly applied and within five minutes, the pressure was reduced to less than 0.15 mm. of mercury. The residual polymer was stirred at this temperature and pressure for sixty minutes during which time the viscosity of the melt increased rapidly until the polymer was wrapping about the stirrer in a ball. The product from this second, or melt phase, stage of the polymer preparation was cooled, removed from the flask and found to have an inherent viscosity of 1.68. The final polymer contained 82.5 percent by weight of the copolyether, and for further evaluation the polymer was extracted with ether in Soxhlet extractor for six hours to remove the residual Aroclor 5442.

Samples of the extracted elastomer were pressed into film and the degree of set determined on stretched samples at various temperatures using the test method already described. The results are given numerically below.

Temperature, ° C.: Percent set
0 ---------------------------------------- 47
10 ---------------------------------------- 40
15 ---------------------------------------- 37
20 ---------------------------------------- 30
25 ---------------------------------------- 27
30 ---------------------------------------- 20

EXAMPLE 7

A polyester was prepared exactly as in Example 1 except that as the polyether glycol portion there was employed 37 g. (0.01 mole) of a polyether glycol of number average molecular weight 3,700 prepared from a mixture of 90 mole percent of tetrahydrofuran and 10 mole percent of 3-methyl-8-oxabicyclo[4:3:0]-nonane. The degree of set at different temperatures for a film sample made from this polyester was determined as described in previous example and the figures are given below.

Temperature, ° C.: Percent set
0 ---------------------------------------- 58
10 ---------------------------------------- 45
15 ---------------------------------------- 39
20 ---------------------------------------- 32
25 ---------------------------------------- 28
22 ---------------------------------------- 22

As indicated above, the present invention provides new compositions of matter which are outstanding in their usefulness in the production of elastomeric polyester fibers, filaments, films and other shaped objects by providing a source of material to constitute the soft segments in such elastomeric products and to give them outstanding elastic properties.

Although the invention has been described in considerable detail with particular reference to certain preferred embodiments thereof, variations and modifications can be effected within the spirit and scope of the invention as described hereinabove, and as defined in the appended claims.

I claim:

1. A copolyether glycol characterized by an essentially trans configuration and having the structural formula

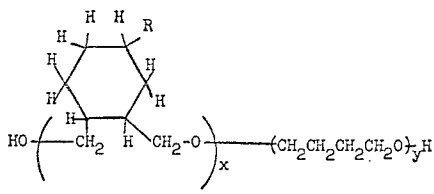

wherein R is a substituent selected from the group consisting of hydrogen or methyl, $x$ and $y$ are integers greater than zero and selected from the group defined by the equations $x<y$ and $x+y=14$ to 70 and wherein the two repeat units are distributed in a substantially random manner in the copolyether molecule.

2. A glycol as defined by claim 1 wherein R represents a methyl radical.

3. A glycol as defined by claim 1 wherein R represents a hydrogen atom.

References Cited

UNITED STATES PATENTS 3,243,413  3/1966  Bell et al.

OTHER REFERENCES

Wittbecker et al.: Jour. Amer. Chem. Soc., vol. 82 (1960), pp. 1218–1222.

BERNARD HELFIN, *Primary Examiner.*